6596X
C. H. McCORMICK.
Side-Hill Plow.
Patented June 13. 1831
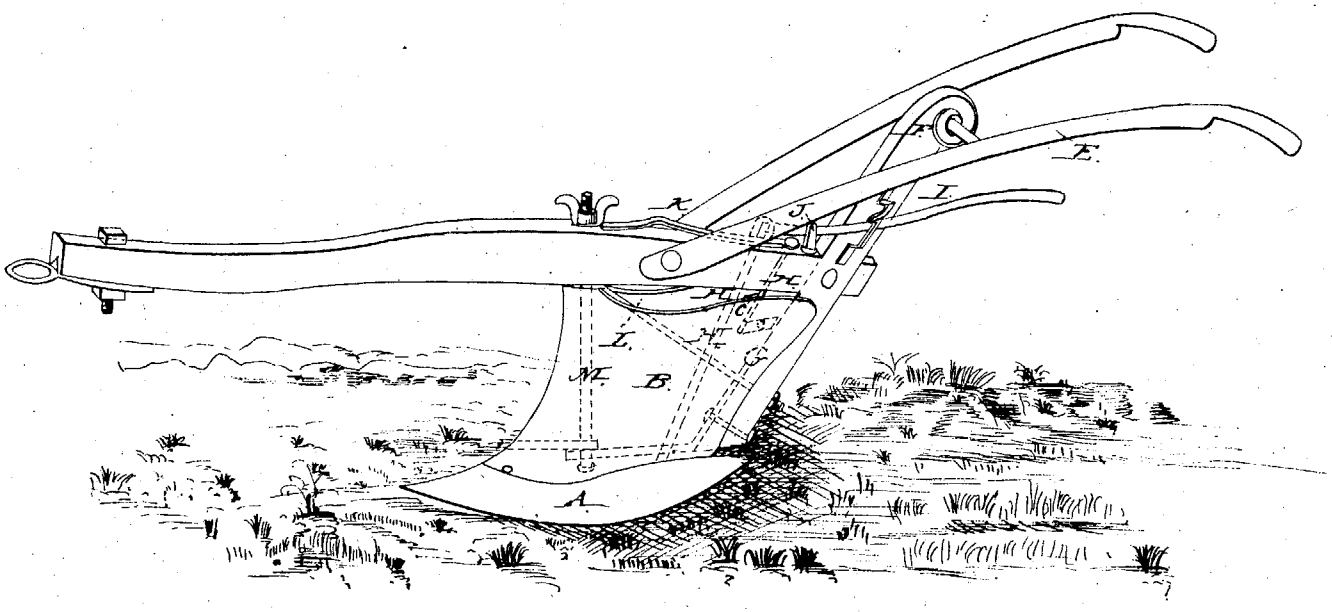

June 13, 1831 6596X [illegible]

Cyrus H. McCormick
Letters Patent

The Schedule referred to in these Letters Patent and making part of the same containing a description in the words of the said Cyrus H. Mc Cormick himself of his improvement in the Hill side Plough

---

Be it known that I Cyrus Mc Cormick of Rockbridge County State of Virginia have made an improvement in the Hill side Plough which is described as follows. This plough consists of the following parts 1st The share 2d the mould board with its brace 3d The beam, handles, & standard or hinder support. 4th The lower brace bar. 5 The lock-ing rod & lever 6th The fulcrum & spring 7th The brace rod. 8th The pivot rod & screw. 1st The share. The share is made double of iron & steel with a point at each end and a double wing on the same side At each end of the share, at the distance of the point of the mould board is a pin against which the mould board locks and is kept in its place. At a proper distance from the points of the share are two holes one at each end to receive the rod to be hereafter described.
2d The mould board with its brace. The mould board is made double with a brace extending between the wings & supporting them. Thro' which brace are two holes one near each end to receive a pin or locking rod to be hereafter described. Near the front and quite thro' the mould board is a hole thro' which a pivot rod is to pass to be also hereafter describ-ed. 3d The beam handles & standard or hinder support. The beam & han-dles are made in the usual form & of a suitable size and strength, a hole is made thro' the beam to receive the pivot rod. The standard or hinder support is made of any convenient size it is placed at the end of the beam and has a hole mortised in it to receive the tenon of the beam, also a mortise thro' which a brace passes to support the handles. At the lower end of it is fixed the lower brace bar to be next described.
4th The lower brace bar. This is made of iron and extends from the standard or hinder support, to about the middle of the share and has a spring

6/13/1831 6596X opening in it to let the pivot rod pass thro' & is made fast to the standard
or hinder support. There is also another hole near the middle of the
bar thro' which the locking rod passes into the share. 5th. The lock-
ing rod & Lever. The long locking rod passes down thro' the beam thro'
the lower brace bar into the share having a shoulder on the upper side
of the bar to prevent its going too far, and another shoulder or projec-
tion even with the upper side of the beam; to be operated on by a spring
to be hereafter described. This rod extends thro' an opening made
in the spring and has a hook or screw at the upper end to attach it
to the lever. Another locking rod is riveted to the spring & passes thro'
the beam and the holes made near each end of the brace bar of the
mould board. The lever is made of any convenient length & moves on
a fulcrum placed beside the spring & is attached to the first mention-
ed locking rod. There is a pin or projection on the standard or hinder
support to hold it to its place whilst turning the plough. 6th. The
fulcrum & spring. A piece of iron forming the fulcrum is fastened
to the beam and rising two or three inches above the spring, on the top
of which is placed the lever. The spring is made of iron or steel and
is fastened to the beam. At proper distances, openings are made to
let the pivot rod and long locking rod pass. The other locking rod
as mentioned before is riveted to this spring. 7th. The brace rod passes
thro' the standard or hinder support to the beam near where it is
connected with the mould board. There is a hole thro' one end of
this rod. thro' which the pivot rod passes. the other end passes thro'
the standard or hinder support & lower brace bar & is fastened with
a screw. 8th. The pivot rod & screw. The pivot rod is made of iron an
passes thro' the share, the lower brace bar, mould board, beam &
spring & is fastened with a nut on the top. Operation. When it is
required to turn the furrows all one way. the first furrow being run,
the lever is pressed down and fastened by the pin on the side of the
standard or hinder support, by which the long locking rod is drawn
out of the share, the upper shoulder of which also raises the spring
and consequently draws the other locking pin out of the mould
board.

bend brace; all being now loose, the plough is turned, the share remaining stationary and the mould board turned till stopped by the pin in the share. & which produces the required change in the plough so as to throw the next furrow the same with the first. Then disengaging the lever, the spring operates on both the locking rods to fasten both the mould board & share together and the ploughing is recommenced. This plough can also be used as a common plough. What I claim as my invention is the combination and arrangement of the different parts of the above described plough so as to effect the turning and securing the mould board, and other parts of the plough to the share but particularly in making the mould board to turn whilst the share remains stationary and afterwards locking it to the share, together with an improvement in the construction of the share Witness
Wm. P. Elliot
L. Warner Ruggles Cyrus H. McCormick

[478 words]

Patented June 13. 1831